United States Patent [19]

de Oliveira

[11] 4,356,665
[45] Nov. 2, 1982

[54] SELF-WATERING PLANTER

[76] Inventor: Nenzito C. de Oliveira, Estrada Velha de Portao-km. 05, Lauro de Freitas/Bahia-CEP 42.700, Brazil

[21] Appl. No.: 264,077

[22] Filed: May 18, 1981

[51] Int. Cl.³ .............................................. A01G 9/02
[52] U.S. Cl. .......................................................... 47/80
[58] Field of Search ................................. 47/66, 79–81

[56] References Cited

U.S. PATENT DOCUMENTS

| D. 20,034 | 7/1890 | Whilldin | 47/66 X |
| 1,221,449 | 4/1917 | Hitchcock | 47/80 |
| 4,171,593 | 10/1979 | Bigglestone | 47/80 X |

*Primary Examiner*—James R. Feyrer
*Attorney, Agent, or Firm*—J. Gibson Semmes

[57] ABSTRACT

A container for living plants, characterized by nesting pots, the upper pot of which defines a reservoir and the second of which rests within the first to contain a nutrient soil, the second, defining with the first, a water input and the second also having plural ducts extending downward into the reservoir, the ducts each having horizontal channels at respective bottoms with a vertical water flow passageway therein, allowing the flow of water from the reservoir by capillary action, the second pot also having drain holes located within the bottom of the pot, intermediate the respective ducts.

1 Claim, 4 Drawing Figures

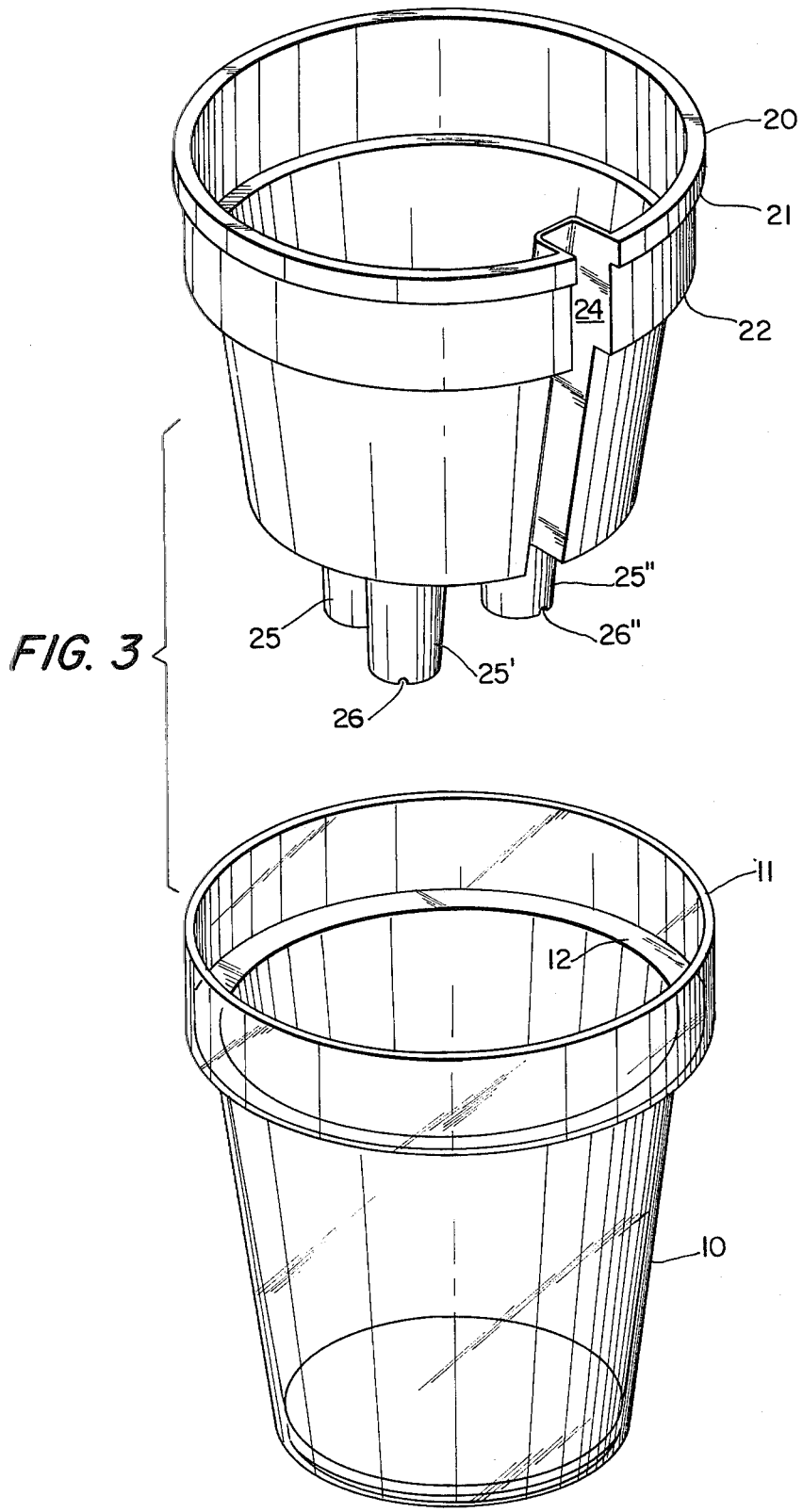

SELF-WATERING PLANTER

CROSS-REFERENCED TO RELATED APPLICATIONS

"Self-Watering Planter" (Vaso Para Planta Auto Irrigavel) a patent application in the nation of Brazil, No. Pl-780.1833 filed Mar. 17, 1978 and published by the Brazil National Institute of Industrial Property in its publication entitled "Industrial Property Magazine," No. 507, on July 9, 1980.

BACKGROUND OF THE INVENTION

1. Field of the invention

This invention pertains to plant pots and more particularly to plant pots containing a fluid reservoir in the lower portion of the plant pot whereby the plant may draw fluid nourishment for a number of days as is needed for normal growth, without refilling of the reservoir.

2. Description of the Prior Art

One of the major problems in growing plants in small pots is that due to the small volume of the pot, water must be added frequently. If too much water is added, the soil becomes over-saturated, the plant roots do not obtain the right air/soil/moisture balance and the plant growth suffers. If not enough water is added, the soil dries out and the plant dehydrates. This situation occurs most frequently in non-commercial situations where owners have located plants in homes or offices, and the press of business or personal affairs causes watering to be neglected.

Another significant problem is soil calcification which is related to the problem of improper watering. In nature, a plant obtains most of its water through capillary action from water tables deep within the soil. Rainfall replenishes the water tables periodically to permit the plant to continue to draw the water it needs. Thus, in nature the water flows from beneath the roots up to the roots. In the normal home or office, a plant is customarily watered by pouring water into the pot on the surface of the soil. Such watering has two detrimental effects: (A) as the water enters the soil surface the interstices between the soil particles retain a portion of the water by capillary action, thus removing it from gravity induced flow to the root level, much lower in the soil. Each level of soil that the water passes through captures and holds some of the water by capillary action. Thus, the amount of water which eventually reaches the roots is dependent upon the depth and porosity of the soil above. Conceivably, were only a small amount of water to be added to a large pot with deep roots, the layers of soil between the top of the pot, where the water was added, and the start of the root level could absorb most of the added water and little or none penetrate to the root level where it would be available for uptake by a plant through the roots; (B) simultaneously with the gravity induced downflow of the added water is an opposite flow caused by the water evaporating from the soil surface. As the water sets in the soil, it dissolves minerals and salts from the soil. In addition, the added water frequently has minerals already dissolved in it. When the interior water is drawn up to the surface, it carries this dissolved mineral load with it. As the water evaporates on the surface, the mineral deposits are left behind, causing a heavy mineral deposit or calcification of the surface of the soil. Each time water is added and evaporates, more minerals are deposited on the surface of the soil. As the mineral content of the soil surface increases, the soil becomes harder and less porous, shutting off necessary airflow to the roots and causing plant growth to falter.

The present apparatus fulfills a long-felt need to solve these problems in an inexpensive-to-produce, easy-to-use container. Other inventors have attempted to solve these problems. Wong, Jr., U.S. Pat. No. 3,868,787 issued on Mar. 4, 1975, discloses a holder for supporting a hydroponically cultivated plant. This apparatus required the plant to extend through the open air while supported by a spring-like device. Such an apparatus would not be effective if the distance between the lowest leaf and the first root were small. In addition, the device is complicated and portable only with difficulty. Carlisle, U.S. Pat. No. 4,179,846 granted Dec. 25, 1979, discloses a container wherein roots of a growing plant project through the bottom and sides of a first container restrained by the walls of a second outer container, through an air space to a fluid reservoir wherein they may receive fluid nourishment. In this apparatus, the plant pot is suspended some distance above the fluid reservoir. The reservoir is completely uncovered so roots may enter therein. This complicated apparatus is impractical for use in the home or work-day office. The danger of reservoir spills is high and proper guidance of the plant roots requires constant attention. In addition, initial watering of the pot would tend to make the primary water uptake area to be the pot rather than the reservoir. As a final point, this three-part apparatus is expensive and inconvenient to use.

BRIEF SUMMARY OF THE INVENTION

The present apparatus distinguishably waters plants in the same way that occurs naturally, i.e., water flows from beneath the roots up to the roots. This occurs through capillary action through the openings at the ends of the conical shaped ducts that are submerged in water. Simultaneously, the soil and roots will be able to breathe through the surface. Since the entire soil in the plant pot does not become saturated from top to bottom, the plant roots may also occasionally breathe through the upper holes in the bottom of the container. Because the capillary action from the soil surface is minimized, mineralization/calcification of the soil surface is greatly lessened or eliminated.

The improved plant pot apparatus according to the present invention is characterized by the placement of one soil-bearing pot above a portion of the outer pot such that a water reservoir is formed in the bottom of the outer pot beneath the soil-bearing pot. A plant in the soil-bearing pot obtains its moisture from the reservoir by means of dirt-filled cones or funnel-shaped projections which extend from the bottom of the inner pot and are submerged in the water of the reservoir. Small holes in the bottom tips of the funnel or cone-shaped ducts permit water to pass therethrough and nourish the plant. In addition, the bottom of the inner pot contains other holes at a higher level than those in the funnel or cone-shaped ducts, which may let in either air or water, depending on the depth of water in the reservoir.

It is an object of the present invention to provide a growth container which maintains the ideal level of water humidity in the soil without overwatering.

It is another object of the present invention to provide an economical plant growth container in which the soil absorbs water and nutrients from the internal container reservoir only when necessary.

It is a further object of the invention to avoid mineralization or calcification of and drying of the soil in the plant growth container.

It is yet another object of the invention to allow the soil in the plant growth container to breathe through the surface and through the bottom in a natural way.

It is an additional object of the present invention to store sufficient water for normal plant growth in the growth container reservoir to last for a period of approximately three weeks.

BRIEF DESCRIPTION OF THE DRAWINGS

Further details are explained below with the help of the attached drawings in which:

FIG. 3 is an exploded perspective view showing the functional relationship of coacting elements of the apparatus of FIG. 1.

DESCRIPTION OF THE PREFERRED EMBODIMENT

Figure 1:
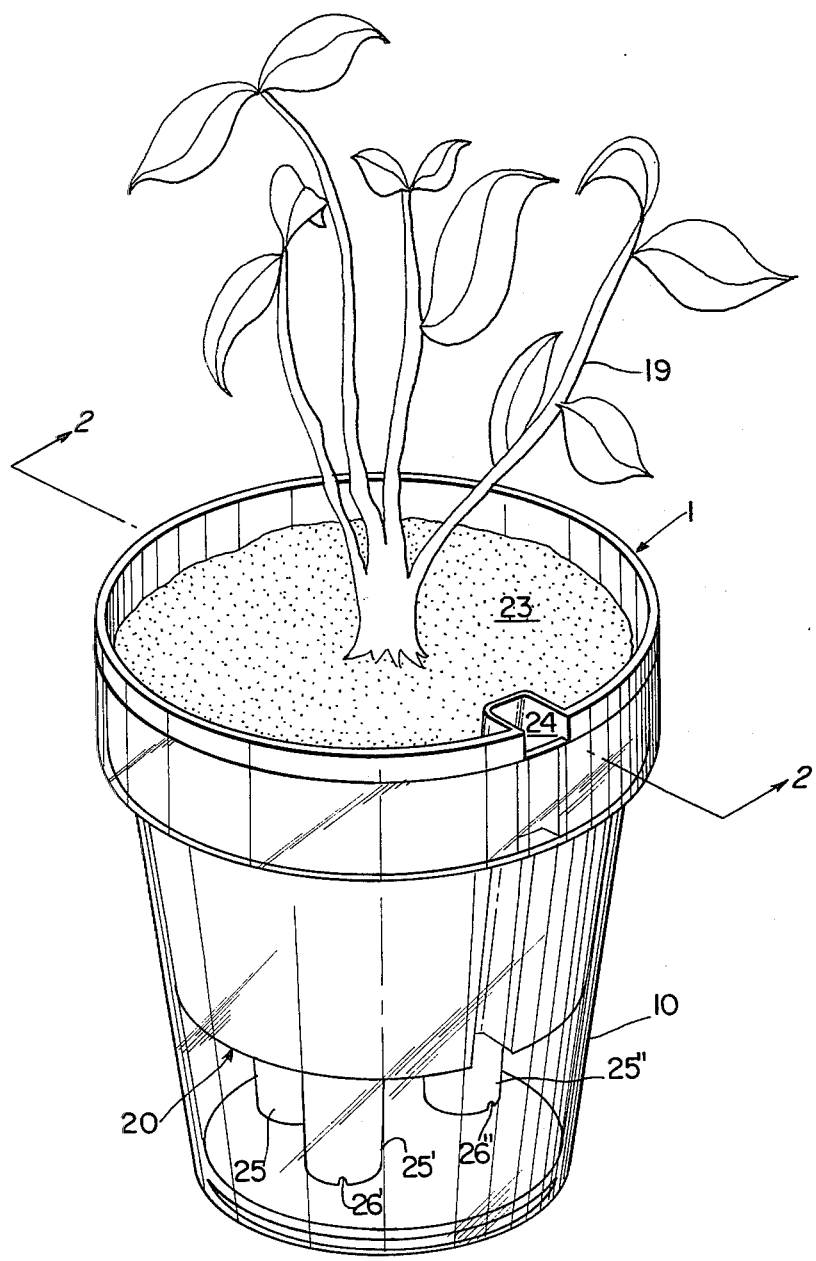
FIG. 1 is a perspective view showing the apparatus of the invention containing a young plant.

Referring to FIG. 1 of the drawings, the plant growth container which is the subject of the instant invention is shown at 1. The growth container is composed of two containers: a larger outer container 10, and a smaller inner container 20, so shaped as to fit inside the outer container. Outer container 10 may be made of any material which is capable of holding water. Ideally, it could be made out of transparent plastic so the owner could easily keep track of the water level in the container. The inner container is supported by two circular bearing surfaces 11 and 12 on the outer container. (Bearing surfaces 11, 12 may be most clearly seen in FIG. 3.)

When the inner container 20 is placed in the outer container 10, lips 21 and 22 of the inner container rest upon bearing surfaces 11 and 12 and support completely the body of the inner pot.

Figure 2:
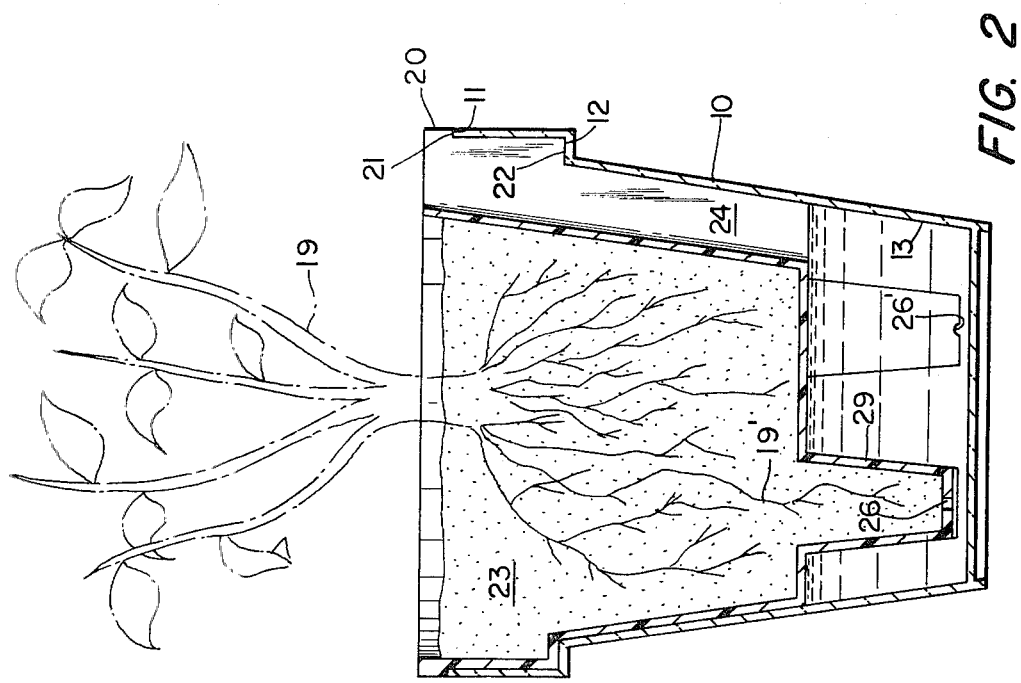
FIG. 2 is a vertical cross-sectional view of FIG. 1 taken along the lines 2—2.

Inner plant pot 20 is shown in FIG. 1 containing a plant 19 growing in a nutrient soild or soiless media 23 with plant roots 19', FIG. 2. The walls of inner pot 10 form a U-shaped vertical water-input tube 24 projecting inward toward the center of the inner pot 20. As may be seen in FIG. 2, the vertical water input tube extends from the top to the bottom of one side of inner container 20. This tube can be molded together with the inner container or can be removable to slide into place on the side of inner container, resting as seen on the drawings 20, when slided into place.

Figure 4:
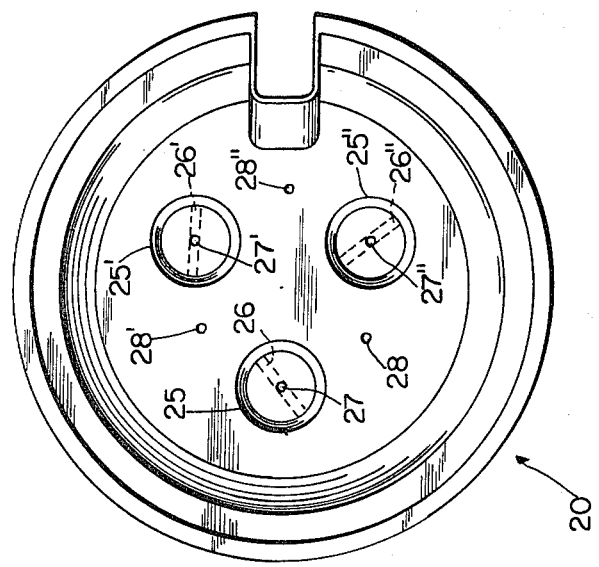
FIG. 4 is a top plan view of the inner pot of FIG. 3.

Projecting from the bottom of inner container 20 are found one or more hollow cylindrical or cone-shaped projections pointing downward, three of which, 25, 25' and 25", are most clearly seen in FIGS. 3 and 4. Cone-shaped projections 25, 25' and 25" terminate a short distance above the inner surface of outer container 10. These cone-shaped projections are filled with nutrient soil or soiless media 23. At the very bottom of each cone-shaped projection is found a small U-shaped horizontal water passageway 26, 26' and 26", see FIGS. 1 and 4, extending from one side of the bottom of the cone-shaped projection to the other side thereof. In the top center of the U-shaped passageway is a small hole, 27, 27' and 27", see FIG. 4, which extends all the way through the bottom of the cone-shaped projection to the interior of the inner container 20.

In addition, on the flat bottom of inner container 20 are found one or more holes, here three holes, 28, 28', 28" shown in FIG. 4. These holes are defined by the inner container 20 and pass completely therethrough.

As may be seen most clearly in FIG. 2, the inner surface 13 of the outer container 10 and outer surface 29 of inner container 20 form a water reservoir as shown. The water from the reservoir flows through the small U-shaped horizontal water passageways 26, 26' and 26" to and through holes 27, 27' and 27" into the interior of inner container 20, where it provides gradual irrigation for the soil 23 and plant roots 22'.

As the water level in the reservoir recedes, holes 28, 28' and 28" are exposed to the air, allowing the soil in the very bottom level of the container to breathe. This promotes plant growth by lessening the opportunity for over-watering with consequent smothering by drowning of the plant roots.

I claim:

1. In the growing of a living plant, apparatus comprising:
(A) a first transparent plant pot having an open top and enclosed bottom;
(B) a second plant pot disposed in nesting relationship to said first plant pot, the second pot having an open top and enclosed bottom, the bottom thereof defining spaced apart plural holes therein for drainage of excess water and for breathing; plural conical ducts, projecting downward from and defined by the bottom of said second pot between the plural holes aforesaid, to terminate above the inner bottom of said first pot, each said conical duct having molded in the lower surface and defined thereby a U-shaped horizontal water flow passageway extending from one side of the bottom of each cone-shaped duct to the other side thereof, each passageway being in random orientation relative to the other, a centrally positioned vertical water flow passageway extending from the lower surface of the cone-shaped duct through the top of the U-shaped horizontal water flow passageway, whereby reservoir fluid may pass freely between the interior of the first pot and the second pot;
(C) a water reservoir defined by the exterior of the second pot and the interior of the first pot;
(D) water input of substantially uniform horizontal cross-section, defined by a vertical side wall of said second pot and the first pot, said input extending from top to bottom of the first pot to permit replenishment of water in said water reservoir without removal of said second pot from the interior of the first pot;
(E) a nutrient soil or soiless growth media disposed inside the second pot, completely filling the conical duct thereof, allowing the passage of reservoir water therethrough, by capillary action.

* * * * *